March 20, 1956 C. F. BLOEDOW Re. 24,133
THREAD COUPLING
Original Filed Dec. 22, 1950
Fig. 1
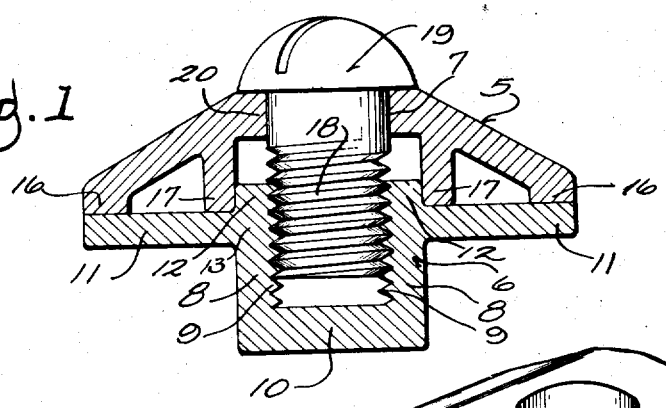
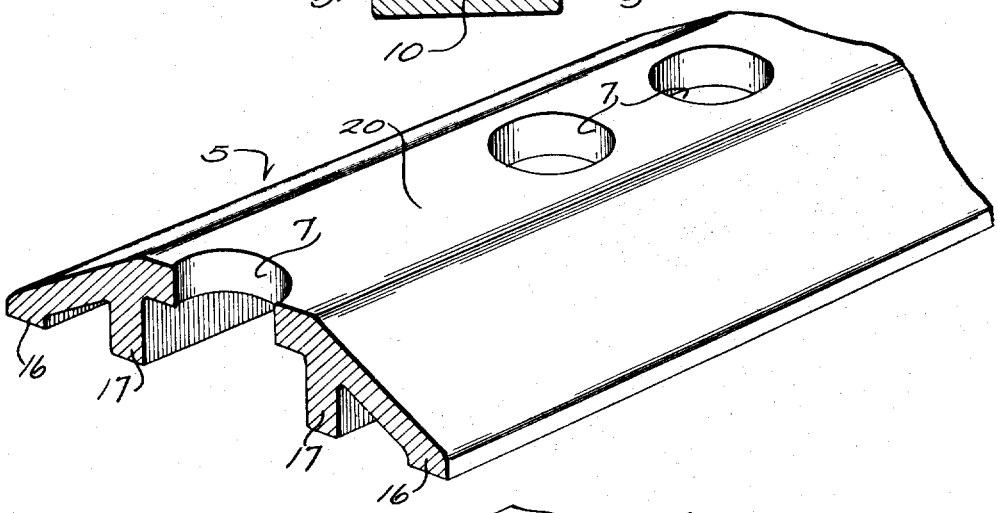
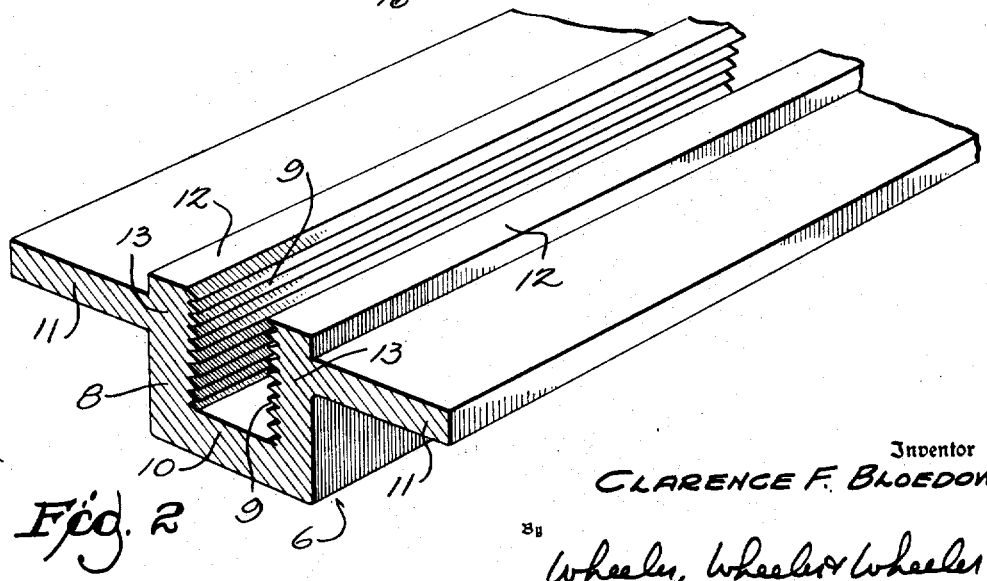
Fig. 2
Inventor
CLARENCE F. BLOEDOW
By
Wheeler, Wheeler & Wheeler
Attorneys United States Patent Office Re. 24,133
Reissued Mar. 20, 1956

24,133

THREAD COUPLING

Clarence F. Bloedow, Milwaukee, Wis., assignor to H & B Enterprise Corporation, Trenton, N. J., a corporation of New Jersey Original No. 2,682,322, dated June 29, 1954, Serial No. 202,247, December 22, 1950. Application for reissue October 20, 1954, Serial No. 464,196

4 Claims. (Cl. 189—36)

Matter enclosed in heavy brackets [ ] appears in the original patent but forms no part of this reissue specification; matter printed in italics indicates the additions made by reissue.

This invention relates to improvements in thread couplings, and more particularly to an extruded thread coupling structure.

The primary object of the invention is to provide [for channel-shaped] members which may be bolted together without regard to the exact longitudinal alignment of one member with the other.

In this connection, it is an object of the invention to provide a [channel] member which comprises a [parallel] thread *coupling* structure integral therewith, and along any point of which the threaded portion of a *predetermined form of* bolt or like fastener may be engaged. By reason of this structure, a threaded bolt may be interconnected with the member at any point along its length. Accordingly, the necessity for aligning bolt holes in one of said members with tapped holes in the other of said members is eliminated. A bolt passed through a bolt hole of one [channel] *member* will be in automatic alignment with [a complementary threaded portion] *the thread coupling structure* of the other [channel] *member*.

A particular object of the invention is to provide this [threaded] *thread coupling* structure by the process of extrusion whereby the entire [channel] *member* having [the] spaced parallel [threads] *walls with longitudinally extending thread engaging ribs thereon,* may be shaped in one extruding operation.

Other objects and advantages of the invention will be more apparent to one skilled in the art upon an examination of the following disclosure.

In the drawings:

Fig. 1 is a transverse cross section through mated [channels] *members* embodying the invention, a coupling bolt being shown in elevation.

Fig. 2 is a perspective view in spaced apart relation of [channel] members embodying the present invention.

In the construction of window casings and frames, show windows and the like, the various frame elements may be preformed and assembled at the factory or on the job. For this purpose extruded shapes may be fabricated and thereafter coupled to construct the desired frame structure.

As best shown in Fig. 2, [channel-shaped] members indicated generally as 5 and 6, and which are desirably of extrudable metal such as aluminum, may be mated and coupled as is best shown in Fig. 1. The particular form of the shapes is variable depending on the purpose for which they are to be used.

[Channel] Member 5 is desirably provided with longitudinally spaced bolt apertures 7, and [channel] member 6 is provided with spaced parallel walls 8 which *have a slot therebetween for receiving a predetermined form of bolt. Said walls have their edges lying in a common plane and* are provided on their facing surfaces with spaced parallel rectilinear [threads 9] *ribs and grooves*

*which are equally spaced and contiguous so as to form serrations 9 which extend longitudinally of the slot parallel to the edges of said walls. The serrations on one of said facing surfaces are located intermediate and in complementary opposed relation with respect to the serrations on the other of said facing surfaces whereby the ribs and grooves on one surface are positioned opposite the grooves and ribs respectively on the other surface. However, since the ribs extend longitudinally of the slot parallel to the edges of the spaced walls, they have no inclination in a direction lengthwise of the thread coupling structure. Nevertheless, the ribs as extruded are formed and spaced apart to correspond to the shape and pitch of the thread of a predetermined size and type of bolt with which the thread coupling structure is to be used.*

The connecting web of [channel] *member* 6 is indicated by the reference character 10 *and serves to hold the parallel walls in rigid spaced relation.* [Channel-shaped] Member 6 may also comprise out-flanges or wings 11 and [ribs] *projections* 12 which constitute extensions of the walls 8 beyond the junction 13 of the walls 8 and the wings 11.

In the preferred embodiment of the invention [channel] member 6 is an extruded shape wherein the walls 8, web 10, wings 11, [ribs] *projections* 12, and [threads] *the ribs and grooves which make up the serrations* 9 are formed in a single die by the process of extrusion so that upon issuance from the die, the [channel] *member* is in substantially finished condition.

[Channel] Member 5 is also desirably an extruded shape and is formed with paired outboard positioning flanges or abutments 16, comprising flanged side margins of the [channel] *member,* and with paired inboard positioning flanges or abutments 17 comprising spaced walls which embrace the [ribs] *projections* 12 of [channel] *member* 6 when the respective [channels] *members* are mated. The ends of the abutments 16 and 17 are co-planar whereby to define the mated position of [channel] *member* 5 against the wings 11 of [channel] *member* 6. By reason of the embrace of the [ribs] *projections* 12 by the walls 17 of [channel] *member* 5, the [thread] *serrated* structure 9 is braced against spreading when the threaded shank 18 of bolt 19 is engaged through one of apertures 7 in the [channel] *member* 5 and with the [threads] *ribs or serrations* 9 of [channel] *member* 6. Bolt 19 is desirably of the type in which each thread on shank 18 is of the same diameter to insure maximum threaded connection with the [threads] *rectilinear ribs* 9 of walls 8, and to insure against wedging apart the walls 8.

The web 20 of [channel] member 5 is of substantial thickness in the vicinity of the bolt apertures 7 to guide the bolt shank 18 on its axis and restrain the bolt from bodily swinging in the plane of the [threads 9 to cut the threads] *slot between walls 8 to cut the serrations 9,* although this is not a serious problem unless great tightening pressure is applied.

As before stated, in the present invention critical longitudinal alignment of one member with the other is not necessary. Bolt 19 will always engage the portion of the thread *coupling structure* opposite the selected bolt hole 7. By fabricating the respective [channels] *members* and particularly [channel] *member* 6, by the extrusion process, the shapes are rapidly produced in substantially finished condition and at a relatively small cost. By provision for a bolt having a thread disposed on a cylindrical helical path the walls 8 are not wedged apart during the coupling of the [channels] *members.*

*With this construction the bolt is secured in a fixed position normal to the thread coupling structure by angular engagement of a plurality of turns of the inclined thread on the bolt with a plurality of the rectilinear ribs on the facing surfaces of the walls of the slot. The bolt is*

*restrained against transverse tilting movement by engagement of the portion thereof located within the slot with the side walls of the slot. Further, the bolt is restrained against longitudinal tilting movement by engagement of the helical threads with the rectilinear ribs at multiple points on opposite sides of the bolt throughout that portion of the bolt located in the slot.* As the bolt apertures 7 have walls of substantial thickness, the bolts *further* will be restrained from [laterally swinging] *any swinging movement which might tend* to cut or strip the *rectilinear* threads 9.

I claim:

[1. Mating channel-shaped members comprising a first member having longitudinally spaced bolt apertures and a second member having spaced parallel walls and continuous threads on said walls to be aligned in any mated position of said channel members with said bolt apertures, said second member being provided with transversely aligned wings on the walls and with extensions of said parallel walls extending beyond the junction of said wings with said walls, said first member having positioning flanges embracing said wall extensions to laterally brace the threads.]

[2. The device of claim 1 in combination with a bolt having a shank and a thread on the shank disposed on a cylindrical helical path.]

[3. The device of claim 2 wherein said second member with its continuous threads comprises an extruded shape.]

[4. In a thread coupling, the combination with a nut comprising spaced parallel walls having facing surfaces with continuous parallel threads on said surfaces, flanges extending outwardly from said walls, and ribs on said nut beyond the junction of said flanges with said walls, of a mating channel member having a bolt aperture, a bolt through said aperture, said bolt having threads engaged with the threads on said walls, and paired flanges extending from said channel and mutually spaced to laterally embrace the ribs on said nut.]

[5. The device of claim 4 in which said ribs comprise extensions of said walls, said ribs having facing threaded surfaces engaged by said bolt.]

[6. The device of claim 4 in which the paired flanges of said mating channel comprise inboard flanges, said channel being provided with paired outboard flanges laterally spaced from said inboard flanges, said inboard and outboard flanges having edge surfaces finished to a common plane substantially parallel to the outwardly extending flanges on the nut.]

*7. A thread coupling structure formed to receive a bolt having a helical thread of predetermined pitch thereon, said structure embodying two spaced rigid walls with parallel edges, said walls having a slot therebetween presenting parallel facing surfaces each of which is provided with a series of serrations consisting of similar, equally spaced, rectilinear ribs extending longitudinally of said slot and parallel to said edges, the ribs on one of said surfaces being located intermediate and in complementary opposed relation with respect to the ribs on the other of said surfaces, said ribs being spaced apart a distance equal to said predetermined pitch and positioned to cause a plurality of said ribs to engage a plurality of the turns of the thread on opposite sides of a bolt upon screwing thereof into said slot.*

*8. The combination comprising a strip of material having a thread coupling structure presenting a pair of parallel rigid walls extending longitudinally of the strip with a fastener receiving slot therebetween, the facing surfaces of said walls having free edges which are parallel, each of said surfaces being provided with a series of longitudinally extending ribs which are similar in cross section and parallel to each other and to the free edges of said walls, the ribs on one of said surfaces being arranged intermediate the ribs on the other of said surfaces, and a threaded member extending into said slot and having a helical thread thereon, the threaded member being held in fixed position normal to said strip by a plurality of turns of the thread on said member angularly engaging a plurality of said longitudinally extending ribs on the thread coupling structure at multiple points on opposite sides of that portion of the threaded member located in said slot.*

*9. An assembly comprising two strips extending parallel to each other in parallel planes and secured together by a bolt having a helical thread thereon, one of said strips having a thread coupling structure thereon in the form of two spaced rigid walls having parallel edges, said walls having a bolt receiving slot therebetween and presenting parallel facing surfaces each of which is provided with a series of serrations consisting of similar, parallel, rectilinear ribs extending longitudinally of said slot and parallel to said edges with the ribs on one of said surfaces positioned parallel to, but intermediate the ribs on the other of said surfaces, the other strip having an opening therein in transverse alignment with said slot, and said bolt extending through said opening and into said slot in a position normal to said strips, said bolt being restrained against transverse tilting movement by engagement with said walls and restrained against longitudinal tilting movement by engagement of multiple turns of said helical thread with a plurality of said rectilinear ribs.*

*10. An assembly comprising two strips extending parallel to each other in parallel planes and secured together by a threaded bolt, one of said strips being an extruded form having a thread coupling structure extending longitudinally thereof with flanges extending outward on opposite sides of the thread coupling structure, the thread coupling structure embodying two spaced rigid walls having edges which are parallel, said walls having a slot therebetween and presenting parallel facing surfaces each of which is provided with a series of parallel, contiguous, rectilinear ribs and grooves extending longitudinally of said slot and parallel to said edges with the ribs and grooves on one of said surfaces positioned opposite the grooves and ribs respectively on the other of said surfaces, the spacing between the ribs of each series being equal to the spacing between the threads on said bolt, the other strip having a portion thereof extending generally parallel to said flanges and urged toward said flanges by said bolt, said bolt extending through an opening in the latter strip and into said slot, the threads of said bolt being disposed in a helical cylindrical path with the turns of the thread on that portion of the bolt extending into said slot being inclined with respect to said longitudinally extending ribs and grooves and said bolt being held in fixed position normal to said strips by binding contact of a plurality of turns of the thread on said bolt with a plurality of said ribs and grooves at multiple points on opposite sides of said bolt.*

References Cited in the file of this patent or the original patent

UNITED STATES PATENTS

| | | |
|---|---|---|
| 596,948 | Seely | Jan. 4, 1898 |
| 646,465 | Seely | Apr. 3, 1900 |
| 834,288 | Friberg | Oct. 30, 1906 |
| 905,316 | Hoerle | Dec. 1, 1908 |
| 1,223,595 | McMillan et al. | Apr. 24, 1917 |
| 1,254,216 | Day | Jan. 15, 1918 |
| 1,596,360 | Krey | Aug. 17, 1926 |
| 1,677,140 | Ketterman | June 17, 1928 |
| 1,714,411 | Walter | May 21, 1929 |
| 1,779,346 | Trachte | Oct. 21, 1930 |
| 1,882,881 | Plym | Oct. 18, 1932 |
| 1,963,153 | Schmieder | June 19, 1934 |
| 2,073,278 | Hohl | Mar. 9, 1937 |
| 2,156,347 | McLaughlin | May 2, 1939 |
| 2,196,032 | Schmidtt | Apr. 2, 1940 |

(Other references on following page)

UNITED STATES PATENTS

| | | |
|---|---|---|
| 2,200,227 | Olson | May 7, 1940 |
| 2,364,668 | Simmons | Dec. 12, 1944 |
| 2,368,824 | Tinnerman | Oct. 15, 1945 |
| 2,370,375 | Simmons | Feb. 27, 1945 |
| 2,440,053 | Macomber | Apr. 20, 1948 |

FOREIGN PATENTS

| | | |
|---|---|---|
| 586,832 | Germany | of 1933 |
| 190,965 | Switzerland | of 1937 |
| 199,990 | Switzerland | of 1938 |
| 636,852 | Great Britain | May 10, 1950 |